A. B. HEDGES.
LOCOMOTIVE TIRE LIMIT OF WEAR GAGES.
APPLICATION FILED APR. 29, 1919.

1,346,748.

Patented July 13, 1920.
2 SHEETS—SHEET 1.

Witnesses
Geo. E. Logan

Inventor
Anthony B. Hedges
By Victor J. Evans
Attorney

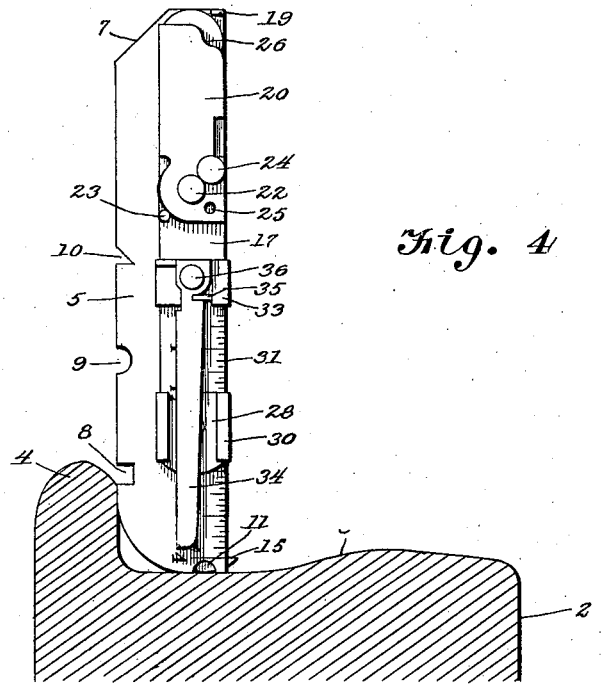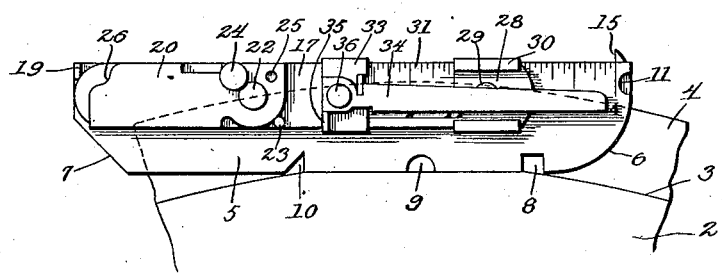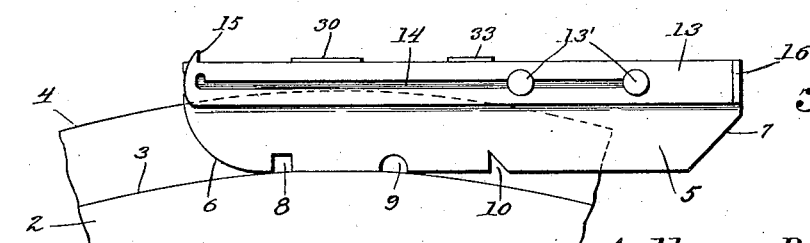

UNITED STATES PATENT OFFICE.

ANTHONY B. HEDGES, OF BRUNSWICK, MARYLAND.

LOCOMOTIVE-TIRE LIMIT-OF-WEAR GAGE.

1,346,748.  Specification of Letters Patent.  Patented July 13, 1920.

Application filed April 29, 1919. Serial No. 293,395.

*To all whom it may concern:*

Be it known that I, ANTHONY B. HEDGES, a citizen of the United States, residing at Brunswick, in the county of Frederick and State of Maryland, have invented new and useful Improvements in Locomotive - Tire Limit-of-Wear Gages, of which the following is a specification.

This invention relates to gages for determining the wear of locomotive tires and the principal object of the invention is to provide a gage having means thereon for indicating the measurements of all the parts of the tire as required by the laws and rules of the Interstate Commerce Commission.

Another object of the invention is to provide means whereby the parts of the gage may be folded together so that the device may be carried in the pocket of the inspector or other person using the gage.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figs. 3, 4, 5 and 6 are views showing how the device is used to measure the wear of the different parts of a tire.

Figure 2:
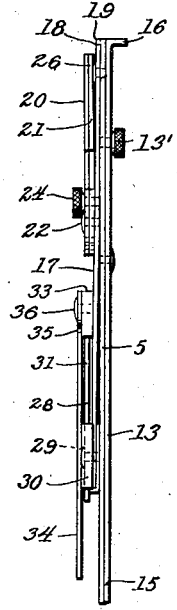
Fig. 2 is an edge view showing the device in folded position.

In these views 1 indicates a portion of a locomotive wheel and 2 indicates the tire thereof, said tire having the tread part 3 and the flange 4 as usual.

As is well known, the laws and rules of the Interstate Commerce Commission require that wheels be discarded after the tires of the same have become worn to a certain extent, and it is the object of my invention to provide a gage for indicating when this limit has been reached.

In carrying out my invention, I provide a straight edge supporting member 5 which may be graduated as shown and which has one of its ends, at one side, curved as at 6 while its other end, at the same side, is cut away on an incline as at 7. This same side is provided with a substantially rectangular notch 8, a curved notch 9 and a substantially V-shaped notch 10. The curved end 6 is also provided with a curved notch 11. The other side of the member is provided with a rectangular notch 12. The member carries a sliding bar 13 which is secured to said member by the pins 13′ engaging the elongated slot 14 in said bar. At its inner end this bar is provided with a lateral projection 15 which extends from one edge thereof and at its other end the bar is provided with a right angular projection 16 which acts as a finger piece for moving the bar. The member 5 has pivoted to its inclined end an arm 17 which is adapted to be swung into a position at right angles to the member and held in this position by the notch 18 engaging the projection 19 on the end of said member. This projection limits the outward movement of the arm. This arm has pivoted thereto the fingers 20 and 21. These fingers are placed one on the other and are connected with the arm by the pivot pin 22. A pin 23 on the arm limits the outward movement of the arms by engaging notches formed in said arms and the arms are locked in either folded or extended positions by means of the set screw 24, engaging one or the other of a pair of holes 25 formed in said fingers. Each of these arms is provided with an offset edge which is adapted to engage with the inner face of the flange 4 of the wheel and this edge is shortened by forming a curved recess at the outer end of each arm, as shown at 26. As shown in dotted lines in Fig. 1, one of these fingers is of greater width than the other finger so that the fingers may be used for measuring flanges of different thicknesses as the rules permit some wheels to have a flange of less thickness than another kind of wheel.

The outer part of the arm 17 is provided with a longitudinally extending slot 27 and a bracket 28 is slidably attached to this outer part by means of the screw 29 engaging said slot. This bracket is of U-shape so as to embrace the arm and it is provided with the side flanges 30 forming guides for the graduated finger 31. This finger is provided with a slot 32 which is engaged by the screw 29 so that the finger may be held in adjusted position by said screw. By sliding the bracket to the end of the arm 17, which has its corner rounded off, said bracket may be turned at right angles so that the finger will lie parallel with the arm. The finger 31 carries a sliding sleeve 33 to which is pivoted a bar 34. This bar is held in either a position at right angles to the finger or a position parallel with the finger by the stops 35 on the sleeve engaging notches in the bar. The pivot pin 36 which connects the bar 34 with the sleeve 33 passes through the sleeve and into a slot 37 formed in the outer end of the finger 31 so that the sleeve and bar may be clamped in adjusted position on said finger.

Figure 1:
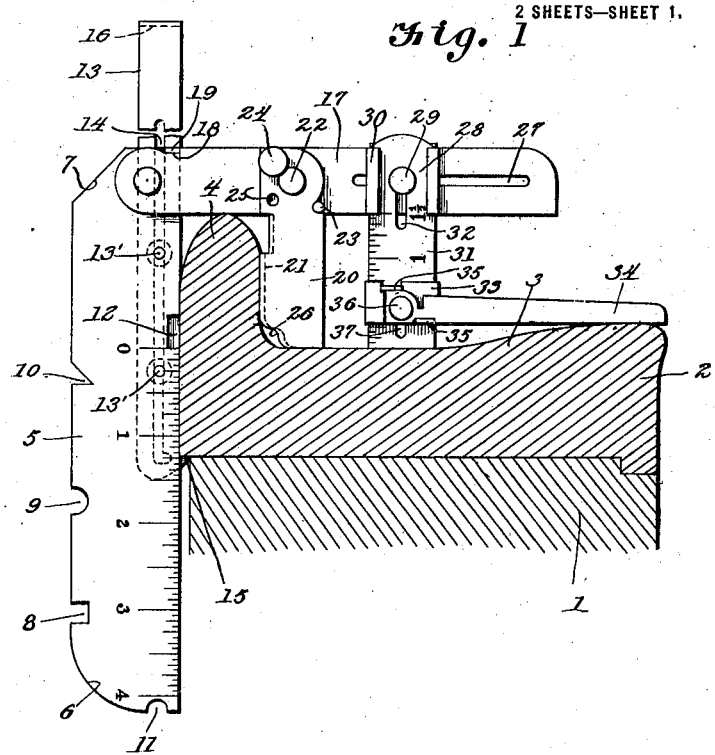
Figure 1 is a view partly in section showing how the gage is used to take the measurement of the wear on the flange and tread of a tire.
Figure 3:
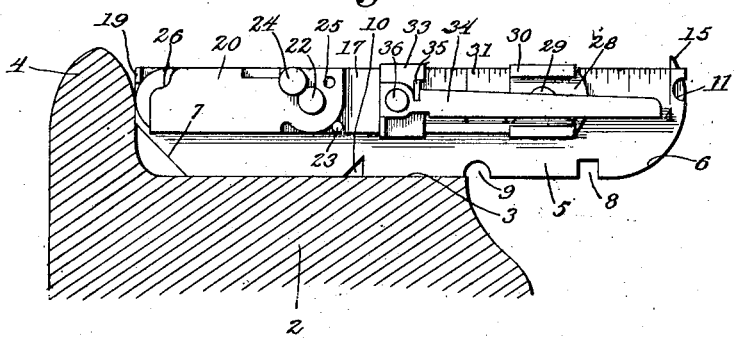

It will thus be seen that the parts of the gage may be swung outwardly to the position shown in Fig. 1 so as to determine the wear on the tread and flange of the tire. The parts may be locked in this position by the screws 24, 29 and 36 clamping the parts together. When the device is not in use, the parts may be folded one upon the other, in the position shown in Fig. 2 by removing the screw 24, swinging the fingers 20 and 31 upon the arm and replacing the screw 24 in the other hole 25 in the fingers, as shown in Fig. 3. Then the bar 34 is swung into parallel position with the finger 31 and this finger and bracket moved to the outer end of the arm 17 and turned at right angles to the position shown in Fig. 3. Then the arm 17 may be swung over the member 5 and the bar 12 pushed inwardly, as shown in Fig. 2.

The graduations on the part 5 will give the thickness of the tire. If the device is being used to measure the flanges of wheels in which the law sets $\frac{15}{16}$ths of an inch as the limit of thickness, the finger 20 will be used, as shown in Fig. 1. In those wheels where the limit is one inch the other finger will be used. This measurement must be made at a point $\frac{3}{8}$th of an inch above the tread and in order to take the measurement at this point, I provide a notch 12 and the recesses 26. If the flange will enter the space between the straight edge of the member 5 and the finger then the inspector knows that the limit has been reached. The finger 31 will measure the height of the flange and this finger with the bar 34 will also give the amount of wear of the tread. The parts will be in proper position when the projection 15 is placed in engagement with the projecting edge of the inner circumference of the tire and the bar 12 has been set to the desired position.

Fig. 3 shows the device being used to gage broken rims. As shown in this view, the inclined edge 7 of the member 5 permits the measurement to be taken from a point on the flange above the tread, the curved notch 9 indicating the limit permitted.

Fig. 4 shows the device being used for gaging a worn flange. In this case the notches 8 and 11 at the curved end of the member 5 indicate the limit of height of the vertical wear of the flange of the tire.

Figs. 5 and 6 show the device being used for gaging flat and shelled spots on the tread.

In Figs. 3, 4, 5 and 6, the device is shown as being used similar to the gage now in use.

What I claim is:—

1. A gage of the class described comprising a straight edge supporting member, an arm extending at right angles to said member and a finger carried by said arm and having a flange-engaging projection thereon, said finger lying parallel with the supporting member and forming with said member a flange receiving space.

2. A gage of the class described comprising a straight edge supporting member, an arm extending at right angles to said member and pivoted thereto and a finger pivoted to said arm and having a flange-engaging projection thereon, said finger lying parallel with the supporting member and forming with said member a flange receiving space.

3. A gage of the class described comprising a straight edge supporting member, an arm pivoted to said member and adapted to extend at right angles thereto, a finger pivoted to the arm and having a flange-engaging edge thereon, a graduated finger also pivoted to the arm and a bar pivoted to the last mentioned finger.

4. A gage of the class described comprising a straight edge supporting member, an arm pivoted thereto and adapted to extend at right angles therefrom, a pair of fingers placed one upon the other and pivoted to the arm, one of said fingers being of greater width than the other and each having an offset flange-engaging edge thereon and a recess at its end spacing said edge from the said end of the finger.

5. A gage of the class described comprising a straight edge supporting member, an arm pivoted thereto and adapted to extend at right angles therefrom, said arm having an elongated slot therein and a rounded corner on its outer end, a bracket embracing said arm and adapted to be given a quarter turn about said rounded corner, a screw member carried by said bracket and engaging the slot, a graduated finger slidably mounted in said bracket and adapted to be held in adjusted position by said screw member.

6. A gage of the class described comprising a supporting plate having a straight edge, an arm carried by and extending at right angles from said plate, a finger carried by said arm and lying parallel with the plate and forming with said plate a flange receiving space, said finger having an offset edge for engaging the flange and a recess at its end.

7. A gage of the class described comprising a supporting plate having a straight edge for engaging the face of the wheel, an arm pivoted to said plate, a stop for holding said arm at right-angles to the plate, a flange engaging finger pivotally connected with said arm, a graduated finger pivotally and slidably connected with said arm and a bar pivotally and adjustably carried by said graduated finger.

In testimony whereof I affix my signature.

ANTHONY B. HEDGES.